United States Patent Office 3,373,225
Patented Mar. 12, 1968

3,373,225
TRANSPARENT FLAME RETARDANT UN-
SATURATED POLYESTER RESINS CON-
TAINING ANTIMONY TRIHALIDE
Edward R. Degginger, Syracuse, N.Y., assignor to Allied
Chemical Corporation, New York, N.Y., a corporation of New York
No Drawing. Filed Oct. 23, 1965, Ser. No. 504,196
1 Claim. (Cl. 260—863)

ABSTRACT OF THE DISCLOSURE

Hard, transparent, flame retardant unsaturated polyester resins are prepared by reacting a halogenated unsaturated polyester resin, a vinyl monomer, an antimony tri-halide flame retardant and a catalyst.

---

This invention relates to new compositions of matter comprising halogen-containing unsaturated polyester-based thermosetting resins. More particularly this invention relates to new polymerizable compositions of matter comprising halogen-containing unsaturated polyester resins and to new fire-resistant thermosetting resins produced therefrom.

Synthetic resins such as halogen-containing polyester resins have found wide-spread use throughout industry. For instance, such resins are employed in the preparation of castings, moldings, foamed articles or laminated structures bonded by polyester resins. Typical illustrations of applications of polyester resins are found in castings for live electrical contacts and in the building trades where the polyesters are used to prepare structural members, wall coverings, panels and pipes. The resins employed in the foregoing applications must be hard, infusible, polyester resins which are flame-retardant, heat-resistant and transparent or have a high degree of light transmission.

It is therefore an object of the present invention to provide new halogenated unsaturated polyester-based thermosetting resin compositions characterized by good hardness, transparency and flame-resistant properties. A further object of this invention is to provide a novel curing system for halogenated unsaturated polyester resins. Further objects and advantages of the invention will appear more fully from the following description.

I have now found that new compositions of matter are produced by curing a halogenated unsaturated polyester resin in the presence of a small amount of an antimony trihalide compound. The actual composition of the resulting hard, transparent, flame-resistant polyester resin compositions is unknown, since it is not known whether the antimony trihalide reacts with the polyester or with a polymerizable monomer, or whether it is present as an unreacted additive.

Among the advantages obtained by employing the novel curing system of the present invention in the preparation of halogenated polyester-based thermosetting resins is that hard, transparent, fire-resistant products are obtained which do not require the use of fire-proofing additives which have adverse effects on the mechanical and optical (light transmission) properties; furthermore, such additives tend to exude a phenomenon which further impairs the usefulness of the plastic. The new halogenated, unsaturated polyester-based thermosetting resin compositions of the present invention exhibit good mechanical and improved optical and flame-retardant properties when compared to flame-retardant halogenated unsaturated polyester-based thermosetting resins prepared by conventional means.

In accordance with the present invention, hard, transparent, flame-retardant thermosetting resins are prepared by dissolving an antimony trihalide compound in a solution of a halogenated unsaturated polyester resin and an ethylenically unsaturated monomer, such as styrene, initiating polymerization of said solution of halogenated unsaturated polyester/ethylenically unsaturated monomer/antimony trihalide by incorporating a polymerization initiator, such as benzoyl peroxide, and maintaining said solution at a temperature of from 25 to 150° C. for a period of 2 to 20 hours. If it is desired to post-cure the composition, this may be accomplished by further heating at a temperature of 50 to 200° C. for an additional 1 to 300 hours, preferably at a temperature of 100 to 150° C. for 2 to 24 hours.

This invention may be practiced with halogenated unsaturated polyester resins having a chemically bound halogen content of at least 5 percent and up to about 70 percent by weight and where the antimony trihalide is soluble in the polyester system. The preferred halogen-containing polyesters of this invention contain 9 to 24 percent chlorine. The halogen which is combined with the polyester may be any one or a mixture of those conventionally employed in the preparation of halogenated polyesters such as chlorine, bromine and fluorine. Suitable halogenated unsaturated polyesters which may be employed in the present invention are those in which the halogen is present in the acidic component such as the polycarboxylic acid or anhydride. Typical of such polyesters are those prepared by esterifying tetrachlorophthalic acid, tetrachlorophthalic anhydride, Het Acid or Het Anhydride with polyhydric alcohols. Similarly, the halogen can be contained in the glycol component of the polyester as for example, those polyesters prepared by esterifying 1,4,5,6,7,7-hexachlorobicyclo-(2·2·1)hept-5-ene-2,3-diol; epichlorohydrin, etc., with polycarboxylic acids and anhydrides. Mixtures of the above-mentioned halogenated dicarboxylic acids and anhydrides with the abovementioned halogenated polyhydric alcohols and epoxides may also be employed in preparation of halogenated unsaturated polyester resins for use in the present invention. Further, the chemically combined halogen may be introduced into the unsaturated polyester by means of a halogenated, ethylenically unsaturated cross-linking agent such as alpha halo substituted styrene.

The ethylenically unsaturated monomeric cross-linking agent with which the halogenated unsaturated polyester is copolymerized is a polymerizable material containing a —$CH_2$=<group, such as styrene, which is the preferred cross-linking agent, vinyl acetate, divinyl benzene, vinyl toluene, alpha halostyrene, acrylic esters, methacrylic esters and triallyl cyanurate. The halogen content of the cross-linked resin may range from about 10 to 70 percent. The polymerizable mixture contains 20 to 50 percent polymerizable monomer cross-linking agent and 80 to 50 percent halogenated unsaturated polyester resin.

It is desirable to employ conventional polymerization initiators in the antimony halide-containing curing system of the present invention. It is preferred to employ benzoyl peroxide as the initiator; however, other conventional polymerization initiators such as dicumyl peroxide, di-t-butyl peroxide, methyl ethyl ketone peroxide, lauroyl peroxide, perlauric acid, and azo compounds such as azobis-isobutyronitrile, etc., may be employed. The initiators may be employed in amounts of from 0.01 to 10.0 percent, preferably from 0.01 to 1.0 percent based on the total composition.

The antimony trihalide compound employed in the present invention, which may be antimony trichloride or antimony tribromide, is present in the curable composition in amounts of from 0.1 to 20 percent with the preferred range being 0.5 to 5.0 percent.

EXAMPLE I

A polyester was prepared by polycondensation of 26 parts propylene glycol, 15 parts maleic anhydride, 12 parts of adipic acid and 47 parts of 1,4,5,6,7,7-hexachlorobicyclo (2·2·1) hept-5-ene-2,3-dicarboxylic acid. To a solution of 70 parts of this polyester and 30 parts of styrene was added 2.0 parts antimony trichloride, and 1.0 part benzoyl peroxide. This solution was cast as a ⅛" sheet between glass plates at 80° C. for 18 hours and post-cured in an oven at 100° C. for 1 hour and then at 140° C. for 2 hours. The hard, clear, slightly yellow sheet was subjected to a flame retardancy test (ASTM D–635–56T), and it extinguished immediately. The properties of this resin and the properties of a control resin (without $SbCl_3$) are as follows:

| Property | Control | 2% $SbCl_3$ |
|---|---|---|
| Izod Impact, ft.-lbs./in. notch | 0.32 | 0.32 |
| Compressive Strength, p.s.i. | 17,000 | 18,200 |
| Barcol Hardness | 43 | 43 |
| RT Flexural Strength, p.s.i. | 13,700 | 16,800 |
| RT Flexural Modulus, p.s.i. | 500,000 | 510,000 |
| Tensile Strength, p.s.i. | 7,990 | 7,920 |
| Elongation, Percent | 1.6 | 1.6 |
| Heat Deflection Temperature, ° C | 81 | 64 |
| Extinguishing Time, sec | 348 | 2.5 |

EXAMPLE II

Poly 2-(chloromethyl)ethylene fumarate was synthesized as follows:

Epichlorohydrin (342 g., 3.5 moles), maleic anhydride (343 g., 3.5 moles) and t-butylhydroquinone (0.35 g.) were placed in a 1 liter, four-necked resin kettle equipped with a thermometer, condenser, mechanical stirrer and an inlet for nitrogen. The mixture was heated gradually with stirring until it became homogeneous (about 40° C.) under a stream of dry, oxygen-free nitrogen. Fifty percent aqueous sodium hydroxide (0.83 g.) was then added and the temperature brought to 95° C. Stirring was continued at 95° C. for 11 hours. The acid number of the reaction product was 43.1 mg. KOH/g.

To 600 g. of this polyester was added 40.0 g. of vinyl acetate. A solution consisting of 15 g. of this polyester-vinyl acetate (containing 9.6% Cl), 0.3 g. of antimony trichloride and 0.15 g. of benzoyl peroxide was cast in a test tube for 72 hours at 53° C. and post-cured at 120° C. for 5 hours. The hard, clear test tube casting extinguished immediately when subjected to a flame retardancy test (ASTM D–635–56T). A control resin containing no antimony trichloride burned completely.

EXAMPLE III

Poly 2-(chloromethyl)ethyl fumarate cophthalate was prepared in a manner similar to that described in Example II for the fumarate. A mixture of 342 g. (3.5 moles) epichlorohydrin, 171.8 g. (1.75 moles) of maleic anhydride, 259.5 g. (1.75 moles) of phthalic anhydride, 10.9 g. (0.18 moles) of ethylene glycol and 0.37 g. of t-butylhydroquinone was placed in a 1 liter, 4-necked resin kettle equipped with a thermometer, a reflux condenser, nitrogen inlet and mechanical stirrer. The mixture was heated gradually with stirring until it became homogeneous (about 65° C.) under a stream of dry, oxygen-free nitrogen. Fifty percent aqueous sodium hydroxide (0.95 g.) was then added and the temperature brought to 95° C. Stirring was continued at 95° C. for 5 hours and at 115° C. for 5.5 hours. The acid number of the reaction product was 24.4 mg. KOH/g.

The reaction mass was added to 262.2 g. of styrene containing 0.15 g. of t-butylhydroquinone and the mixture stirred for 30 minutes.

A 100 g. sample of this polyester composition was treated with 3.0 g. antimony trichloride and 1.0 g. of benzoyl peroxide and cast as a ⅛" thick sheet by heating at 60° C. for 3 hours and 80° C. for 20 hours. The sheet was post-cured at 150° C. for 2 hours. Flammability tests of the hard, clear cast sheet showed the sample to have an extinguishing time of 3 seconds. A sample of cured polyester prepared without the addition of antimony trichloride curing agent extinguished in 2.5 minutes.

EXAMPLE IV

To a solution of 70 parts of the polyester cited in Example I and 30 parts of styrene was added 2.0 parts of antimony tribromide, and 1.0 parts of benzoyl peroxide. This solution was cast as a ⅛" sheet between glass plates at 80° C. for 18 hours and post-cured in an oven at 100° C. for 1 hour and then at 140° C. for 2 hours. The properties of this resin are listed below (compare with properties following Example I).

| | |
|---|---|
| Izod impact ft. lbs./in. notch | 0.27 |
| Compressive strength, p.s.i. | 15,640 |
| Barcol hardness | 50 |
| RT flexural strength p.s.i. | 11,290 |
| RT flexural modulus p.s.i. | 532,150 |
| Tensile strength p.s.i. | 4,480 |
| Elongation percent | 2.5 |
| Heat deflection temperature ° C. | 60 |
| Extinguishing time sec. | 10 |

The new halogenated unsaturated polyester-based thermosetting resins prepared according to the methods of the present invention are useful in many reinforced plastic applications, e.g., potting and encapsulation of objects for electrical and other industrial purposes and press molding and hand lay-up work in conjunction with glass-fibre reinforcement.

Although certain preferred embodiments of the invention have been disclosed for purposes of illustration, it will be evident that various changes and modifications may be made therein without departing from the scope and spirit of the invention.

I claim:

1. A transparent, hard, flame resistant polyester resin composition produced by curing a halogenated unsaturated polyester at temperatures ranging from 25 to 150° C. in the presence of an ethylenically unsaturated monomer copolymerizable with said halogenated unsaturated polyester, a flame retardant agent consisting of antimony tribromide and a polymerization initiator.

References Cited

UNITED STATES PATENTS

| | | | |
|---|---|---|---|
| 2,913,428 | 11/1959 | Schoepfle et al. | 260—863 |
| 3,058,928 | 10/1962 | Eichorn et al. | 260—2.5 |

FOREIGN PATENTS

| | | |
|---|---|---|
| 545,915 | 9/1956 | Belgium. |
| 226,601 | 5/1968 | Australia. |
| 1,171,729 | 1/1959 | France. |
| 1,196,645 | 11/1959 | France. |

MURRAY TILLMAN, *Primary Examiner.*

SAMUEL H. BLECH, *Examiner.*

J. T. GOOLKASIAN, *Assistant Examiner.*